(12) United States Patent
Wang (10) Patent No.: US 9,316,849 B2
(45) Date of Patent: Apr. 19, 2016

(54) MOUNTING SYSTEM FOR GLASSES FRAMES

(71) Applicant: OmniVision Technologies, Inc., Santa Clara, CA (US)

(72) Inventor: Yen-Sung Wang, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/278,438

(22) Filed: May 15, 2014

(65) Prior Publication Data

US 2014/0345090 A1  Nov. 27, 2014

Related U.S. Application Data

(60) Provisional application No. 61/826,822, filed on May 23, 2013.

(51) Int. Cl.
*H05K 7/14* (2006.01)
*G02C 11/00* (2006.01)
(Continued)

(52) U.S. Cl.
CPC ............ *G02C 11/10* (2013.01); *G02B 27/0172* (2013.01); *G02B 27/0176* (2013.01); *G02C 11/00* (2013.01); *G02F 1/1362* (2013.01); *G02F 1/133351* (2013.01); *G02F 1/133528* (2013.01); *G02B 2027/0178* (2013.01);
(Continued)

(58) Field of Classification Search
CPC ................... G02B 2027/0178; G02B 27/0176; H05K 7/14; H05K 7/02; H05K 7/1401–7/1405; H05K 7/1417; H05K 7/1418; G02C 2200/02; G02C 2200/06; G02C 2200/08; G02C 2200/20; G02C 11/10; G02C 9/04; Y10T 24/32; Y10T 24/44017; F16B 2001/0035; H01F 7/0252; Y10S 211/01
USPC ............. 24/303, 3.7, 3.3, 3.11, 457; 248/683, 248/206.5, 309.4; 351/111, 41, 52
See application file for complete search history.

(56) References Cited

U.S. PATENT DOCUMENTS 660,990 A * 10/1900 Houghton ................. B42F 1/08
24/546
2,832,114 A * 4/1958 Mead ..................... G02C 11/00
24/10 R
(Continued)

FOREIGN PATENT DOCUMENTS

CN  101014896 A  8/2007
CN  202758142 A  2/2013
(Continued)

OTHER PUBLICATIONS

Chinese Patent Application 201410222332.4 Office Action dated May 15, 2015, 8 pages.
(Continued)

*Primary Examiner* — Robert J Sandy
*Assistant Examiner* — Rowland Do
(74) *Attorney, Agent, or Firm* — Lathrop & Gage LLP (57) ABSTRACT

A system for attaching a device to a glasses frame includes a spring clip that applies pressure to two sides of the glasses frame, and a magnet for attaching the device thereto. The device may attach directly to the magnet, or via a slide-on attachment piece. The spring clip may include a spring arm having distal ends that assist the spring clip in applying pressure to the glasses frames.

7 Claims, 8 Drawing Sheets

(51) Int. Cl.
*G02B 27/01* (2006.01)
*G02F 1/1333* (2006.01)
*G02F 1/1335* (2006.01)
*G02F 1/1362* (2006.01)

(52) U.S. Cl.
CPC ....... *G02C 2200/02* (2013.01); *G02C 2200/22* (2013.01); *G02F 2001/13355* (2013.01); *Y10T 24/32* (2015.01); *Y10T 29/49* (2015.01); *Y10T 29/49787* (2015.01); *Y10T 29/49813* (2015.01)

(56) References Cited

U.S. PATENT DOCUMENTS

| | | | | |
|---|---|---|---|---|
| 3,266,111 | A * | 8/1966 | Abel | B43K 23/001 24/3.3 |
| 3,600,069 | A * | 8/1971 | McNeill | G02C 9/04 351/140 |
| 5,159,639 | A * | 10/1992 | Shannon | G02C 11/06 381/312 |
| 5,664,293 | A * | 9/1997 | Bartoo | A45F 5/02 224/929 |
| 7,419,260 | B1 * | 9/2008 | Wang | G02C 3/003 351/156 |
| 7,735,996 | B2 * | 6/2010 | van der Zwan | G02C 11/06 351/123 |
| D659,741 | S | 5/2012 | Heinrich et al. | |
| D664,185 | S | 7/2012 | Heinrich et al. | |
| 8,508,851 | B2 | 8/2013 | Miao et al. | |
| 2006/0055866 | A1 * | 3/2006 | Dietz | A45F 5/02 351/41 |
| 2007/0251062 | A1 * | 11/2007 | Saitoh | E05B 73/0035 24/303 |
| 2009/0007388 | A1 * | 1/2009 | Villeneuve | A44C 15/003 24/3.3 |
| 2012/0032205 | A1 | 2/2012 | O'Connor et al. | |
| 2012/0081658 | A1 * | 4/2012 | Sugihara | G02B 27/0176 351/158 |
| 2013/0021658 | A1 | 1/2013 | Miao et al. | |
| 2013/0114039 | A1 * | 5/2013 | Zelazowski | G02C 5/2209 351/153 |
| 2013/0235331 | A1 * | 9/2013 | Heinrich | G02C 11/10 351/158 |
| 2013/0250232 | A1 * | 9/2013 | Belbey | G02C 7/02 351/158 |
| 2013/0314303 | A1 * | 11/2013 | Osterhout | G06F 3/005 345/8 |
| 2015/0234201 | A1 * | 8/2015 | Levesque | G02C 3/00 351/155 |

FOREIGN PATENT DOCUMENTS

| | | |
|---|---|---|
| CN | 202758142 U | 2/2013 |
| TW | 201415088 A | 4/2014 |

OTHER PUBLICATIONS

Taiwanese Patent Application 103117949 Notice of Allowance dated Apr. 1, 2015, 4 pages.
Taiwanese Patent Application 103117947 Office Action dated Aug. 27, 2015, received Sep. 17, 2015, 10 pages.
Taiwanese Patent Application 103117949 Notice of Allowance dated Dec. 11, 2015, 3 pages.
Chinese Patent Application 201410222332.4 Notice of Allowance dated Dec. 7, 2015, 5 pages.

* cited by examiner

MOUNTING SYSTEM FOR GLASSES FRAMES

RELATED APPLICATIONS

This application is related to, and claims priority from, U.S. Provisional Patent Application Ser. No. 61/826,822, filed May 23, 2013, and which is incorporated by reference in its entirety herewith.

BACKGROUND

This application relates generally to mounting systems used in conjunction with glasses and glasses frames, and particularly mounting systems for mounting near-eye display systems on glasses frames.

Consumer products including near-eye display systems are becoming more frequent in the marketplace. Such near-eye display systems typically mount directly to or are integral with, a glasses frame that include or do not include actual glasses lenses with the frames.

For example, U.S. Design Pat. No. D659,741 (hereinafter the "D'741 Patent") depicts an exemplary glasses frame utilizing an integral mounted near-eye display system. As can be seen in the D'741 Patent, the near-eye display system mounts directly to the right temple/earpiece portion of the glasses frames. Moreover, U.S. Design Pat. No. D664,185 (hereinafter the "D'185 Patent") illustrates a glasses frame, without lenses, that include an integrally mounted near-eye display system.

Near-eye display systems, such as those described above, require the consumer to wear a specific frame that is sold concurrently with the near-eye display system. Although the D'741 and D'185 patents illustrate an integral near-eye display system and glasses frame, the glasses frame may alternatively include a hole for mounting the near-eye display system directly to the frame via a screw.

SUMMARY OF THE INVENTION

In a first aspect is described a mounting system having for mounting a device onto a glasses frame, the mounting system including a frame attachment portion for removably attaching to the glasses frame having a spring clip including a forward portion and a rearward portion, separated in the lengthwise direction, for applying pressure on the glasses frame from a first side of the glasses frame, and a middle portion for applying pressure on the glasses frame from a second side of the glasses frame; a magnet for coupling to the device, the magnet being housed in a magnet housing, the magnet housing attached to the middle portion of the spring clip; and a pad located between at least part of the middle portion and the forward and rearward portion and applying pressure from the second side.

In another aspect is described a mounting system having a length, width, and height, for mounting a device onto a glasses frame, the mounting system including a frame attachment portion for removably attaching to the glasses frame having: a spring arm including a forward portion and a rearward portion separated in the lengthwise direction, each of the forward and rearward portions (i) having two distal ends separated in the height direction and (ii) attached at a post that applies pressure to the glasses frame from a first side of the glasses frame; a first spring clip, for wrapping around the glasses frame in both the widthwise and height directions, insertable into respective first and second apertures within the forward portion; and, a second spring clip, for wrapping around the glasses frame in both the widthwise and height directions, insertable into respective third and fourth apertures within the forward portion; wherein, when inserted into the apertures, the spring clips apply pressure from a second side of the glasses frame opposite the first side.

BRIEF DESCRIPTION OF THE FIGURES

The foregoing and other features and advantages of the disclosure will be apparent from the more particular description of embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE DRAWINGS

Conventional near-eye display systems are sold with a set of frames and cannot be mounted to any arbitrary frame. Such systems are undesirable to consumers. Many consumers require particular prescriptions, and cannot utilize the near-eye display system because the system is not sold with prescription lenses. Moreover, if the near-eye display system were to allow prescription lenses, the frames available are limited to a few types. Moreover, the use of the near-eye display system must be used in conjunction with the specific frame. Consumers cannot switch the near-eye display system to another arbitrary frame (such as a different pair of glasses, or a pair of sunglasses).

Figure 1:
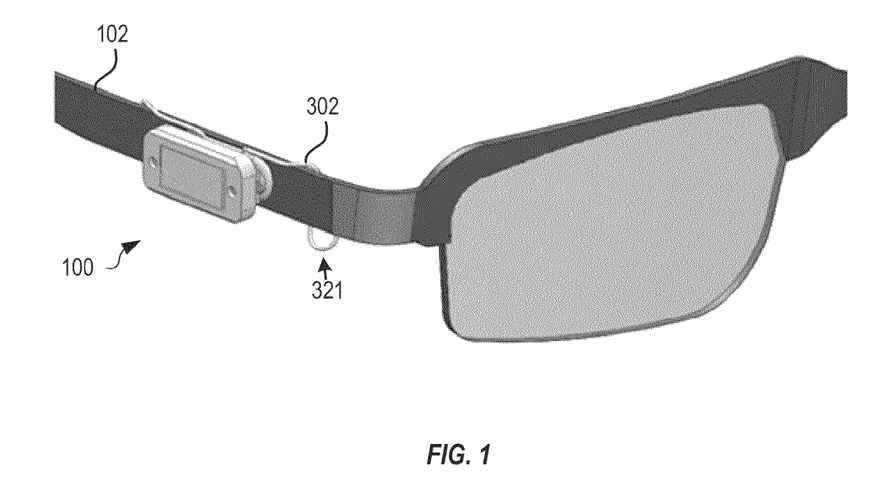
FIG. 1 is a perspective view of an exemplary frame attachment portion of a mounting system for mounting a device to a glasses frame, in one embodiment.
Figure 2:
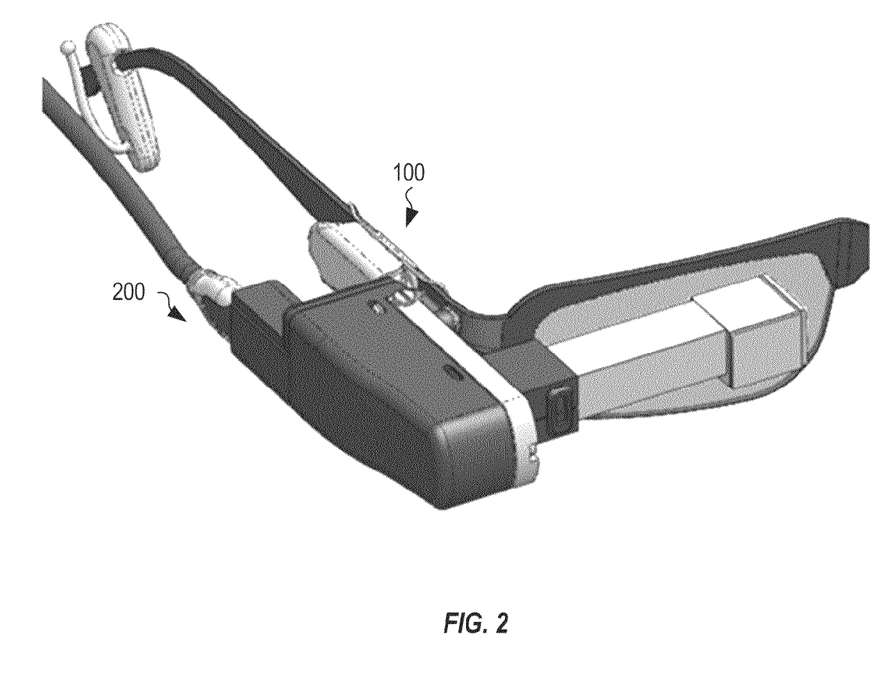
FIG. 2 depicts a perspective view of the frame attachment portion of FIG. 1 mounting a near-eye display, in one embodiment.
Figure 3:
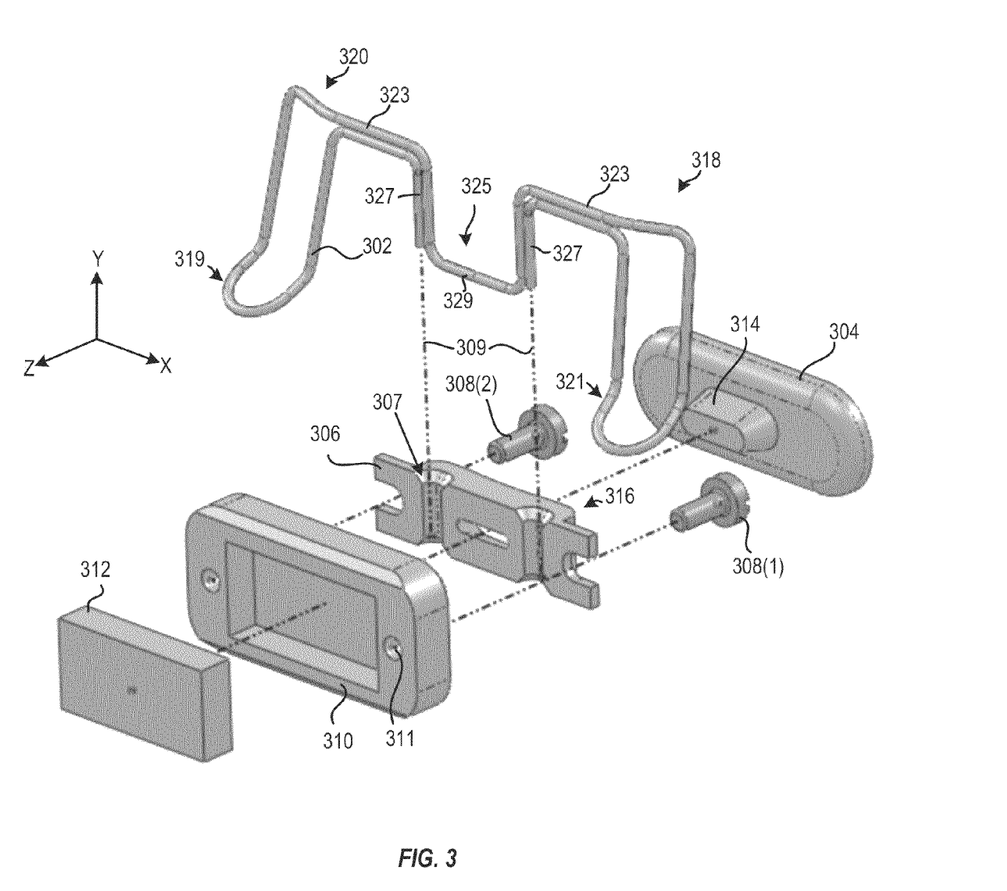
FIG. 3 depicts an exploded view of the frame attachment portion of FIG. 1 in greater detail.
Figure 4:
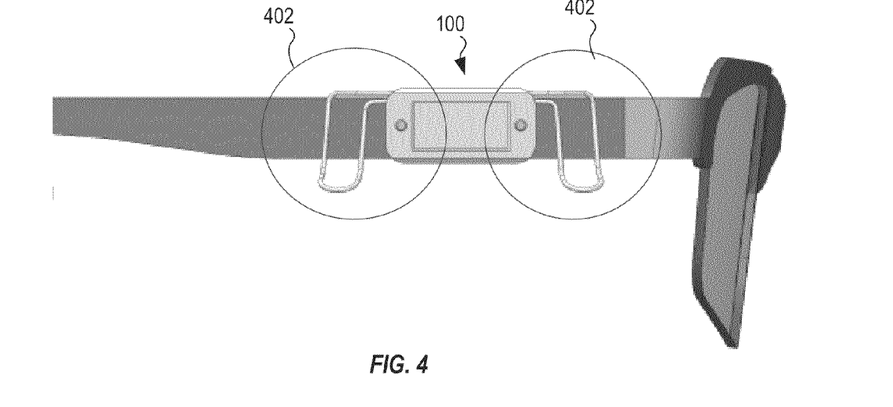
FIG. 4 depicts a side view of the frame attachment portion of FIG. 1 against the glasses frame prior to attachment.
Figure 5:
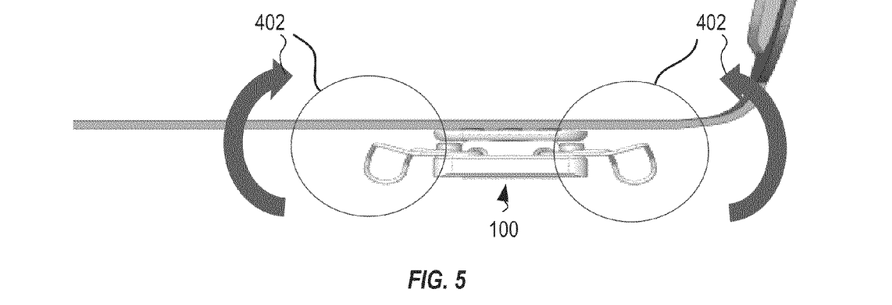
FIG. 5 depicts a top plan view of the frame attachment portion of FIG. 1 against the glasses frame prior to attachment.
Figure 6:
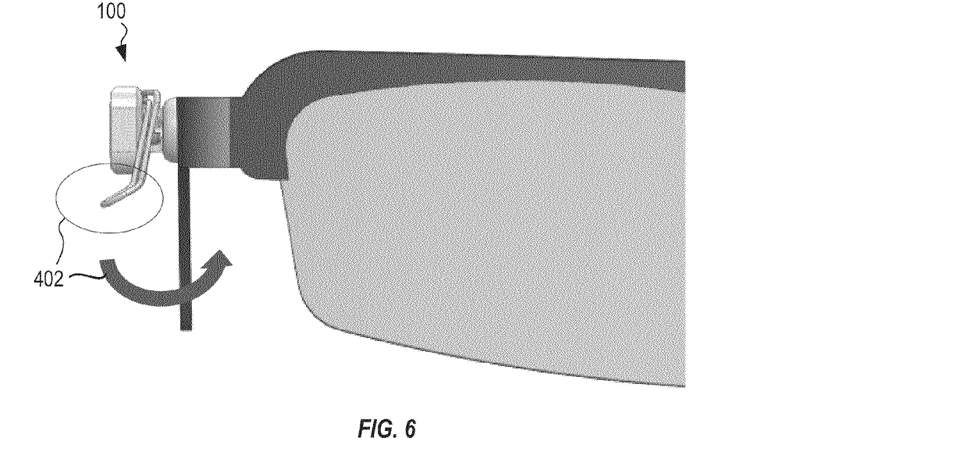
FIG. 6 depicts a front view of the frame attachment portion of FIG. 1 against the glasses frame prior to attachment.
Figures 7, 8:
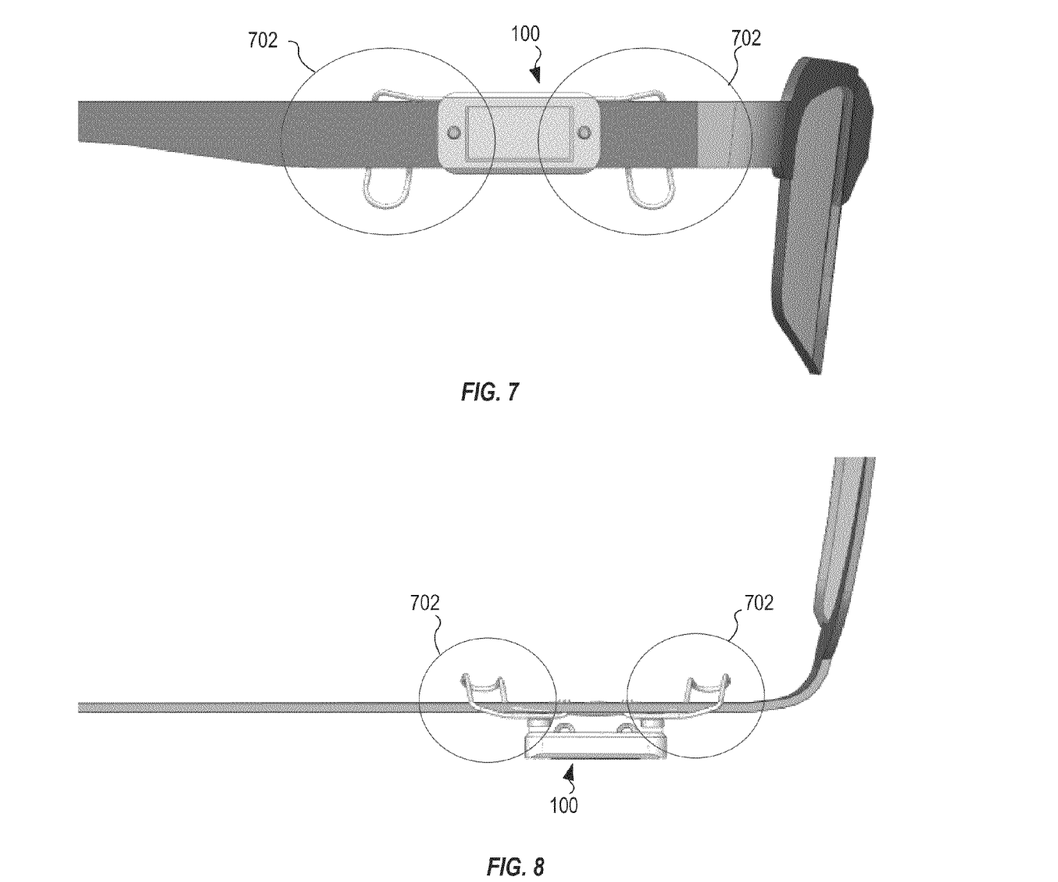
FIG. 7 depicts a side view of the frame attachment portion against the glasses frame after attachment.
FIG. 8 depicts a top plan view of the frame attachment portion of FIG. 1 against the glasses frame after attachment.
Figure 9:
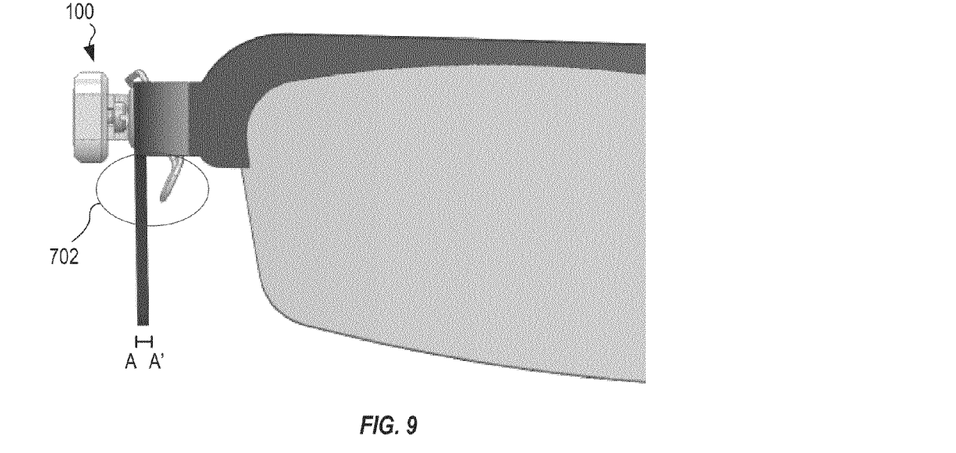
FIG. 9 depicts a front view of the frame attachment portion of FIG. 1 against frame after attachment.

Attachment of Mounting System to Glasses Frame:

FIG. 1 is a perspective view of an exemplary frame attachment portion 100 of a mounting system for mounting a device to a glasses frame 102, in one embodiment. FIG. 2 depicts a perspective view of frame attachment portion 100, of FIG. 1, mounting a near-eye display 200, in one embodiment. FIG. 3 depicts an exploded view of frame attachment portion 100, of FIG. 1, in greater detail. FIG. 4 depicts a side view of frame attachment portion 100 against frame 102 prior to attachment. FIG. 5 depicts a top plan view of frame attachment portion 100, of FIG. 1 against frame 102 prior to attachment. FIG. 6 depicts a front view of frame attachment portion 100, of FIG. 1 against frame 102 prior to attachment. FIG. 7 depicts a side view of frame attachment portion 100 against frame 102 after attachment. FIG. 8 depicts a top plan view of frame attachment portion 100, of FIG. 1 against frame 102 after attachment. FIG. 9 depicts a front view of frame attachment portion 100, of FIG. 1 against frame 102 after attachment. FIGS. 1-9 are best viewed together with the following description. A mounting system including frame attachment portion 100 may be utilized to mount a near-eye display 200 to glasses frame 102 as illustrated in FIG. 2. As will be appreciated in the art, frame attachment portion 100 may be utilized to mount other objects to glasses frame as well, including but not limited to mirrors, lights, cameras, etc.

Referring now to FIG. 3, frame attachment portion 100 is illustrated in an exploded perspective view. Frame attachment portion 100 has a height, a length, and a width, where each characteristic is defined by the largest dimensioned element, or combination of elements, of frame attachment portion 100 (discussed below). Within the figures, the height direction corresponds to the Y-axis, the lengthwise direction corresponds to the X-axis, and the widthwise direction corresponds to the Z-axis.

Frame attachment portion 100 includes spring clip 302, pad 304, holding seat 306, attachment members 308, magnet housing 310 and magnet 312. Spring clip 302, as illustrated in FIGS. 1-9, is formed to removably attach to glasses frame 102. As illustrated in FIG. 1, spring clip 302 removably attaches to the right temple/earpiece of frame 102 (however, it should be appreciated that spring clip 302 may removably attach to other portions of frame 102, such as the left temple/earpiece). Spring clip 302 includes a forward portion 318, a rearward portion 320, and a middle portion 325. Middle portion 325 may be coupled to forward and rearward portions 318, 320 via a top bar 323. Middle portion 325 sits within one or more notches 307 within holding seat 306 (as indicated by dashed lines 309.) For example, middle portion 325 includes two bars 327 each sitting in a respective notch, and a bottom bar 329 which prevents middle portion 325 from sliding out of the notches 307. Although illustrated as having two bars and a bottom bar, middle portion 325 may include more or fewer bars (for example, a single bar that sits within a single notch of the holding seat.) Spring clip 302 may be formed of metal, rubber, plastic, or any other material that is capable of providing resiliency (as discussed below). Moreover, although not shown, spring clip 302 may include a soft outer covering so as to prevent scratching of frame 102.

Holding seat 306 secures to magnet housing 310 via attachment members 308, thereby securely affixing spring clip 302, holding seat 306 and housing 310 together. Attachment members are illustrated as screws attaching to housing 310 via corresponding threaded apertures 311, however it should be appreciated that housing seat 306 may be affixed to magnet housing 310 via alternate attachment means including but not limited to bonding, welding, riveting, or other attachment means known in the art. Moreover, it should be appreciated that in some embodiments, magnet housing 310 is not needed, and housing seat 306 is attached directly to magnet 312.

In certain embodiments, pad 304 is securely attached to holding seat 306 via one or more of the attachment means. Alternatively, pad 304 may be separate from holding seat 306. In such embodiment, pad 304 may include a protrusion 314 and holding seat 306 may include an opposing intrusion 316 in which the protrusion 314 and intrusion 316 align such that pad 304 rests against holding seat 306 when frame attachment portion 100 is mounted on glasses frame 102. Pad 304 contacts glasses frame and applies pressure via middle portion 325 of spring clip 302 from an opposing side of the pressure applied from front and rearward portions of spring clip, as discussed below. Moreover, pad 304 may be made of any suitable material, such as rubber, plastic, foam, wood, metal; may be flexible and/or compressible; and may be any suitable shape as will be appreciated in the art. Optionally, pad 304 is not included and middle portion 325, either directly or via holding seat 306, applies pressure to glasses frame 102.

Frame attachment portion 100 removably attaches to frame 102 via the features of spring clip 302. For example, spring clip 302 is resilient along the widthwise direction (i.e. along the Z-axis). Moreover, one or more of forward portion 318 and rearward portion 320 of spring clip 302 may each include a lip 319, 321, which may work with top bar portion 323 for preventing movement of frame attachment portion 100 along the height axis (i.e. the Y-axis) when frame attachment portion 100 is mounted on frame 102. It should be appreciated that forward portion 318 and rearward portion 320 are relative depending on where the frame attachment portion 100 is mounted on glasses frame 102. In one example, lip 319, 321 may be angled such that any height of frame may be accommodated.

Now referring particularly to FIGS. 4-9, as illustrated, spring clip 302 wraps around frame 102 and rests against a first side of frame 102 (i.e. the inner surface of frame 102). Such wraparound of clip is shown within circles and arrow 402 (as illustrated in FIGS. 4-6) as compared to clip 302 shown within circles 702 (as indicated in FIGS. 7-9). Holding seat 306 and pad 304 rest against an opposing side of frame 102 (i.e. the outer surface of frame 102) once attachment portion is mounted to glasses frame 102. The resiliency of spring clip 302 applies pressure on either side of frame 102 from clip 302 and pad 304 (i.e. between points A and A' of FIG. 9) such that frame attachment portion 100 is removably attached to frame 102. Moreover, top bar portion 323 and lip portions 319 and 321 prevent frame attachment portion 100 from sliding off of frame 102 in the Y direction (i.e. the height direction).

Frame attachment portion 100 provides numerous advantages. For example, frame attachment portion 100 enables exchangeability of frame attachment portion 100 between multiple pairs of glasses frames 102. Moreover, frame attachment portion 100 allows for mounting on either side of glasses frames 102. Additionally, frame attachment portion 100 adapts for different size characteristics of glasses frames 102. The pressure provided by spring clip 302 and pad 304 applies to thin frames as well as thick frames. Further yet, frame attachment portion 100 is capable of being used with any type of glasses frame. Therefore, any near-eye display device, or other device, may be mounted on glasses frame from different sources (such as designer frames, sunglasses, reading glasses, etc.).

Figure 10:
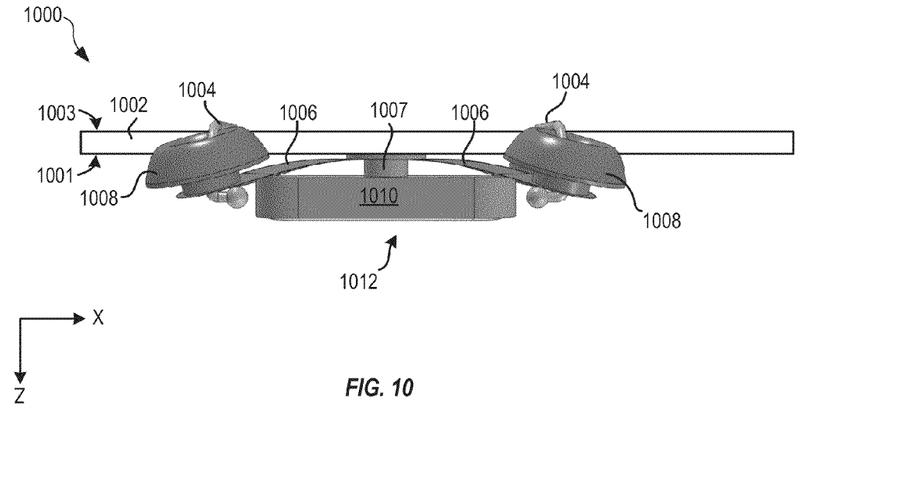
FIG. 10 depicts a top plan view of an exemplary frame attachment portion of a mounting system for mounting a device to glasses frame, in an alternate embodiment.
Figure 11:
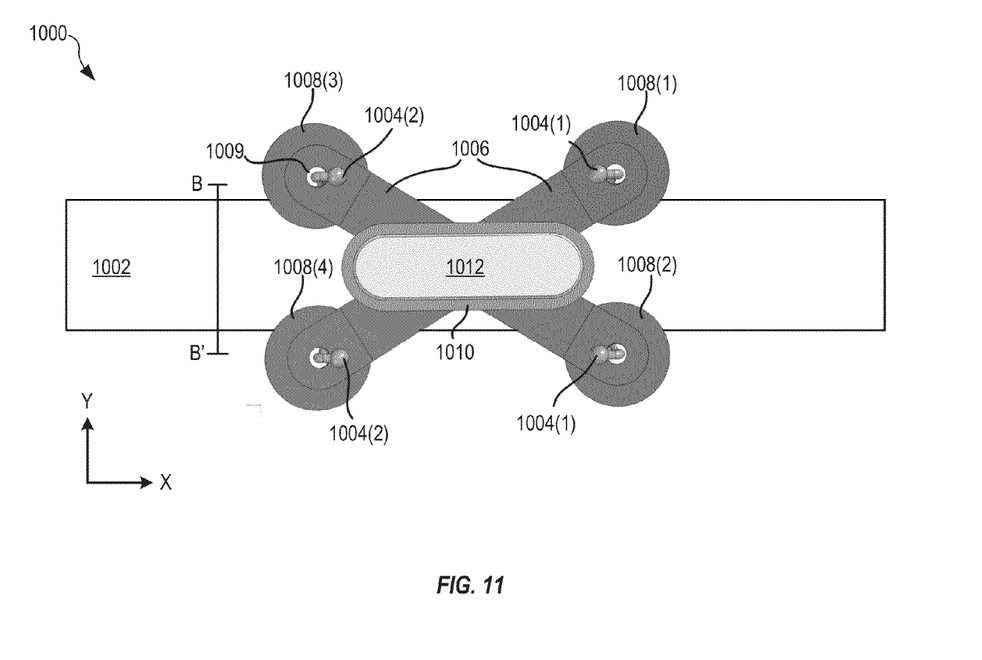
FIG. 11 depicts a side view of the frame attachment portion of FIG. 10.
Figure 12:
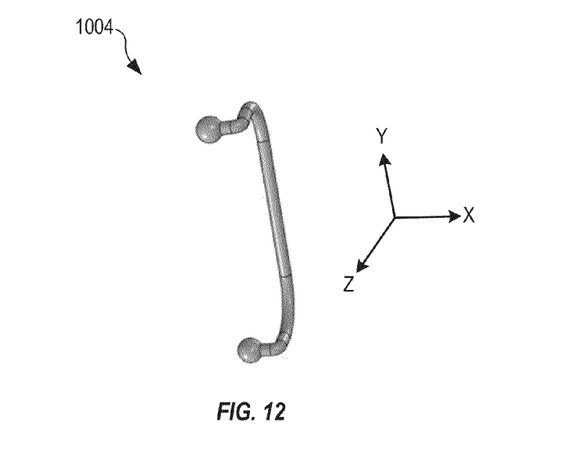
FIG. 12 depicts an exemplary spring clip used in conjunction with the frame attachment portion of FIG. 10, in one embodiment.
Figure 13:
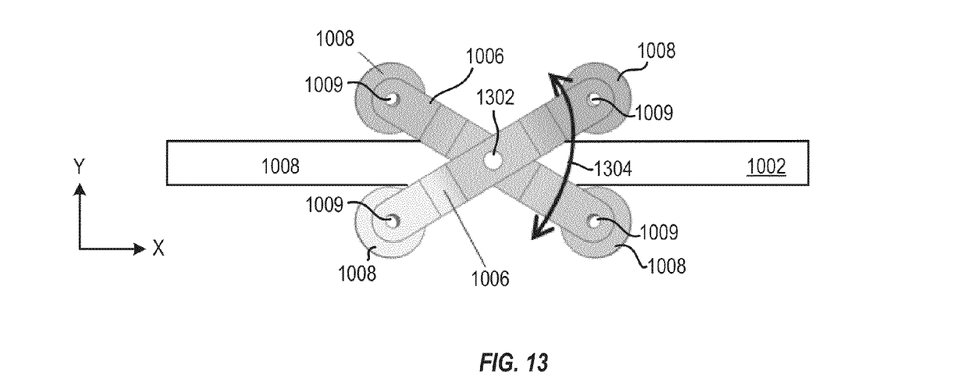
FIG. 13 depicts an exemplary clip arm and pads used in conjunction with frame attachment portion of FIG. 10, in one embodiment.

FIG. 10 depicts, in top plan view, an exemplary frame attachment portion 1000 of a mounting system for mounting a device to glasses frame 1002, in an embodiment. FIG. 11 depicts a side view of the frame attachment portion 1000, of FIG. 10. FIG. 12 depicts an exemplary spring clip 1004 used in conjunction with the frame attachment portion 1000, of FIG. 10, in one embodiment. FIG. 13 depicts an exemplary clip arm 1006 and pads 1302 used in conjunction with frame attachment portion 1000, of FIG. 10, in one embodiment. FIGS. 10-13 are best viewed together with the following description. Frame attachment portion 1000 includes a height, a length, and a width, each characteristic is defined by the largest dimensioned element, or combination of elements, of frame attachment portion 1000 (discussed below). For example, the height direction corresponds to the Y-axis, the lengthwise direction corresponds to the X-axis, and the widthwise direction corresponds to the Z-axis.

Frame attachment portion 1000 includes at least one spring clip 1004, at least one spring arm 1006 each optionally having a pad 1008 mounted thereon at least one distal end, a magnet housing 1010, and a magnet 1012. Magnet housing 1010 and magnet 1012 are similar to magnet housing 110 and magnet 112, discussed above, and are attached to spring arms via an attachment means 1007 (such as a screw, rivet, weld, bond, etc.).

In the embodiment illustrated in FIGS. 10-13, frame attachment portion 1000 includes two spring clips 1004 each comprising a bar that spans at least a portion of the height of system 1000. Particularly, spring clips 1004 are resilient in the height direction such that they provide a tension along the Y-axis. Each spring clip 1004 is removably attachable to one or more spring arms 1006.

As illustrated in FIG. 11, pad 1008 optionally attaches to each respective distal end of each spring arm 1006 thereby forming an aperture 1009 (i.e. aperture 1009 includes an aperture within the distal end and a pad aperture aligned thereto). In certain embodiments, pads 1008 are not included, and spring clip 1004 attaches directly to spring arm 1006 via the aperture. Pads 1008 are illustrated as rubber wheels, but are not intended to be limited in scope. As such, pads 1008 may be formed of other materials and other shapes as will be appreciated by those skilled in the art. Spring clip 1004 inserts into two of apertures 1009, such as one spring clip 1004(1) for the forward apertures, and one spring clip 1004(2) for the rearward apertures.

First spring clip 1004(1) attaches between forward top pad 1008(1) and forward bottom pad 1008(2). Additionally, second spring clip 1004(2) attaches between rear top pad 1008(3) and rear bottom pad 1008(4). Accordingly, each of first and second spring clips 1004 apply pressure between points B and B', thereby securing frame attachment portion 1000 to glasses frame 1002. It should be appreciated that in certain embodiments, pads 1008 are not utilized because post 1007 applies pressure against glasses frame 1002 from a first side (i.e. outer side), and each spring clip 1004 applies pressure from a second side opposing the first side.

In one embodiment, spring clip 1004 additionally applies pressure along the Z-axis (or widthwise direction) such that frame attachment portion 1000 is stationary on glasses frames 1002 when secured. However, in certain advantageous embodiments, spring arm 1006 applies pressure in the widthwise direction (or the Z-axis dimension). For example, referring to FIG. 10, when frame attachment portion 1000 is mounted on frame 1002, spring arm 1006 is formed bent towards magnet housing (i.e. away from the glasses frame) in the widthwise direction. Therefore, spring arm 1006 applies pressure via the spring clip 1004. Thus, constant contact is made between spring clip 1004 and glasses frame 1002 on an inner surface 1003 of glasses frame 1002; also, constant contact is made between post 1007 and glasses frame 1002 on an outer surface 1001 of glasses frame 1002.

FIG. 13 illustrates spring arms 1006 and pads 1008 in greater detail. Spring clips 1004, magnet housing 1010, and magnet 1012 are not depicted in FIG. 13 for clarity of illustration. Spring arms 1006 include two or more arms that are hinged at a middle point 1302 thereby forming an "X" shape. Although illustrated as two separate arms, more or fewer arms may be utilized without departing from the scope hereof (for example, four arms may be hinged at a middle point). In order to mount frame attachment portion 1000 on glasses frame 1002, the distance between each of pads 1008 is increased or decreased (for example in the heightwise direction) as indicated by arrow 1304. Once adjusted, spring clips 1004 are inserted into apertures 1009 such that constant pressure is applied between pads 1008 and glasses frame 1002, thereby securing frame attachment portion 1000 to glasses frame 1002. In one embodiment, once secured, pads 1008 may apply pressure only to a top or bottom surface of glasses frame 1002. In another embodiment, pads 1008 are slanted shaped (see FIG. 10) such that pressure is applied on both (i) a top or bottom surface and (ii) an outer surface 1001 of glasses frame 1002.

Frame attachment portion 1000 provides numerous advantages. For example, frame attachment portion 1000 enables exchangeability of frame attachment portion 1000 between multiple pairs of glasses frames 1002. Moreover, frame attachment portion 1000 allows for mounting on either side of glasses frames 1002, that is, on the left or right temple/earpiece portion of glasses frame 1002. Additionally, frame attachment portion 1000 adapts for different size characteristics of glasses frames 1002. The pressure provided by spring clip 1004 and pads 1008 applies to thin frames as well as thick frames. Further yet, frame attachment portion 1000 is capable of being used with any type of glasses frame. Therefore, any near-eye display device, or other device, may be mounted on glasses frame from different sources (such as designer frames, sunglasses, reading glasses, etc.).

In the embodiments above, magnet 312 and 1012 are illustrated as being substantially flush with magnet housing 310 and 1010, respectively. Such embodiments are advantageous when utilizing a slide-on mounting portion (discussed below) to mount a device (such as a near-eye display system) to mounting system 100 or 1000. However, alternate embodiments do not utilize a slide-on mounting portion and instead the device attaches directly to the magnet.

Figure 14:
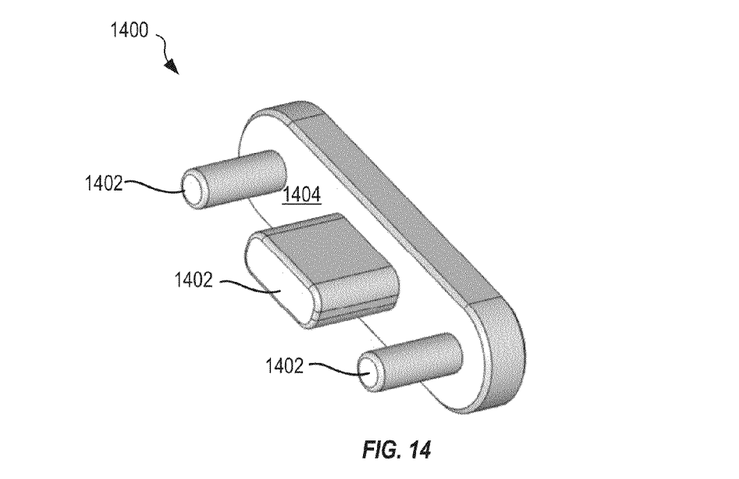
FIG. 14 depicts an exemplary magnet for mounting a device onto a mounting system.

Attachment of Device to Mounting System:

FIG. 14 depicts an exemplary magnet 1400 for mounting a device onto a mounting system. Magnet 1400 may insert into magnet housing 310 or 1010, discussed above. Alternatively, magnet 1400 may be formed integral to the magnet housing—or in other words, the magnet includes apertures, similar to apertures 311 of FIG. 3, for attaching a holding seat, similar to holding seat 306, thereto; or the magnet includes at least a portion of post 1007. Magnet 1400 includes one or more protrusions 1402 extending from a base portion 1404. Protrusions 1402 align with one or more opposing intrusions within the device housing (not shown). When the protrusions 1402 are inserted into intrusions of the device, the device is securely held in place via the magnetic force of magnet 1400. It should be appreciated that more or fewer protrusions may be included with magnet 1400, and further that the shape of protrusions as illustrated is not intended to be limiting in scope.

Figure 15:
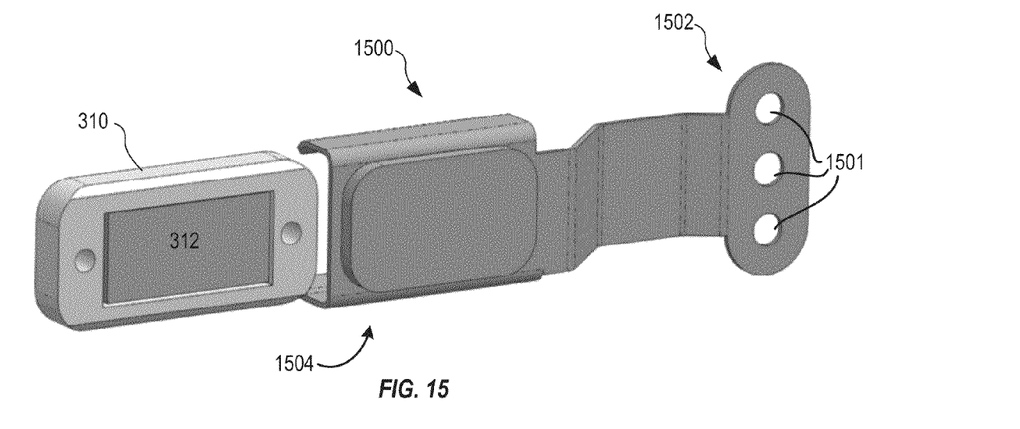
FIG. 15 depicts an exemplary slide-on portion used in conjunction with either of the mounting systems of FIGS. 1-9 or FIGS. 10-13, and prior to attachment, in one embodiment.
Figure 16:
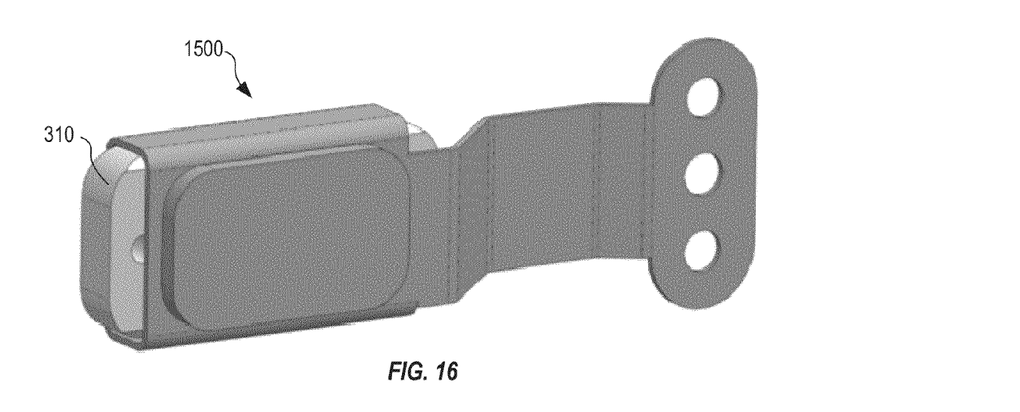
FIG. 16 depicts slide-on portion, of FIG. 15, after attachment to a mounting system.
Figure 17:
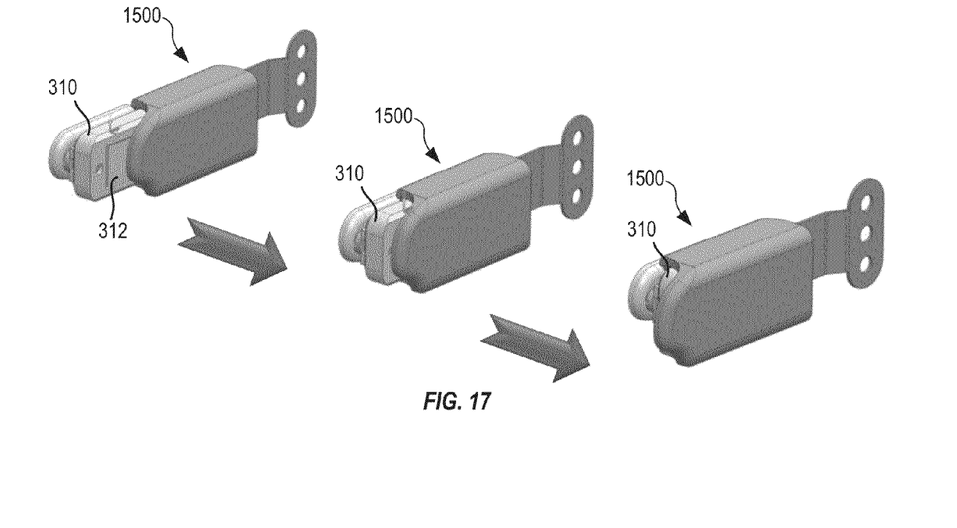
FIG. 17 depicts slide-on portion sliding onto magnet and magnet housing of FIGS. 1-9.
Figure 18:
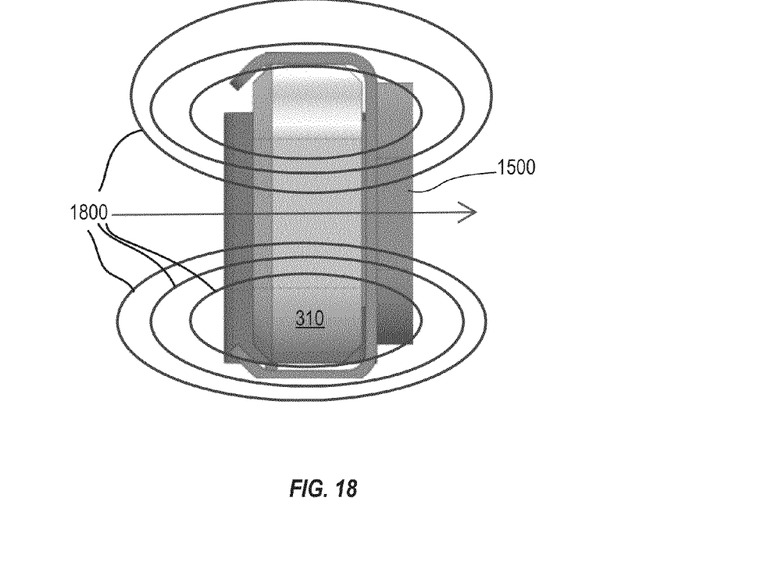
FIG. 18 depicts magnetic force imparted on slide-on portion when locked in place on magnet and magnet housing of FIGS. 1-9.

FIG. 15 depicts an exemplary slide-on portion 1500 used in conjunction with either of mounting systems 100, of FIG. 1-9, or 1000 of FIGS. 10-13, in one embodiment. FIG. 15 shows slide-on portion 1500 prior to attachment to the mounting system. FIG. 16 depicts slide-on portion 1500, of FIG. 15, after attachment to mounting system. FIG. 17 depicts slide-on portion 1500 sliding onto magnet 312 and magnet housing 310, of FIGS. 1-9. FIG. 18 depicts magnetic force 1800 imparted on slide-on portion 1500 when locked in place on magnet 312 and magnet housing 310, of FIGS. 1-9. FIGS. 15-18 are best viewed together with the following description. While FIGS. 15-18 shows slide-on portion 1500 used in conjunction with mounting system 100 of FIGS. 1-9, slide-on portion 1500 may be used in conjunction with mounting system 1000 of FIGS. 10-13, as discussed below for mounting system 100, without departing from the scope hereof.

Slide-on portion 1500 allows a device, such as a near-eye display device, mirror, light, camera, or other device, to releaseably attach to either of mounting systems 100 or 1000, discussed above. Particularly, slide-on portion 1500 includes device attachment portion 1502 for attaching to the device (not shown), and magnet attachment portion 1504 for releasably attaching to mounting system 100 by sliding onto magnet housing 310. Attachment portion 1502 as illustrated includes three apertures 1501 for attaching the device thereon via screws, rivets, etc. It should be appreciated that device 1502 may include more or fewer apertures 1501 than illustrated, and/or may attach by other means such as bonding, welding, gluing, etc.

Magnet attachment portion 1504 is adapted to slide onto magnet housing 310, as illustrated in FIG. 17. Magnet attachment portion 1504 includes a magnetic material, such as a ferromagnetic metal, such that magnetic forces from magnet 312 keep magnet attachment portion in place. In an alternate embodiment, a second magnet is embedded within magnet attachment portion 1504, made of plastic for example, such that magnet 312 and the second magnet interact to provide the magnetic force for holding slide-on portion 1500 onto magnet housing 310. Once attached, slide-on portion 1500 is held in place via the magnetic force. Slide-on portion 1500 releases from housing 310 via pulling on slide-on portion 1500. Removal of slide-on portion 1500 involves moving slide-on portion 1500 in a direction that is generally orthogonal to the magnetic field lines. Therefore, slide-on portion 1500 may be removed with relative ease, while still allowing for a strong magnetic force 1800 for preventing inadvertent removal.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A mounting system for mounting a device onto a glasses frame, the mounting system comprising
   a frame attachment portion for removably attaching to the glasses frame including:
   a spring clip including a forward portion and a rearward portion, separated in the lengthwise direction, for applying pressure on the glasses frame from a first side of the glasses frame, and a middle portion for applying pressure on the glasses frame from a second side of the glasses frame;
   a magnet for coupling to the device, the magnet being housed in a magnet housing, the magnet housing attached to the middle portion of the spring clip;
   a pad located between at least part of the middle portion and the forward and rearward portions and applying pressure from the second side; and,
   a holding seat for securing the middle portion with the magnet housing,
   wherein the middle portion sits between the holding seat and the magnet housing in a notch of the holding seat.

2. The system of claim 1, wherein the middle portion comprises two bars sitting in respective notches of the holding seat, and a bottom bar preventing the middle portion from sliding out of the notches.

3. The system of claim 1, further having a height, width, and length; the spring clip further including:
   a top bar between the middle portion and the forward and rearward portions, wherein each of the forward and rearward portions include a lip separated by the top bar in the height direction;
   wherein the top bar and the lips prevent movement of the mounting system on the glasses frames in the height direction.

4. The system of claim 1, wherein the device is a near-eye display system.

5. A mounting system for mounting a device onto a glasses frame, the mounting system comprising a frame attachment portion for removably attaching to the glasses frame including:
   a spring clip including a forward portion and a rearward portion, separated in the lengthwise direction, for applying pressure on the glasses frame from a first side of the glasses frame, and a middle portion for applying pressure on the glasses frame from a second side of the glasses frame;
   a magnet for coupling to the device, the magnet being housed in a magnet housing, the magnet housing attached to the middle portion of the spring clip;
   a pad located between at least part of the middle portion and the forward and rearward portions and applying pressure from the second side; and
   a slide-on portion having a device attachment portion for attaching the device onto the slide-on portion and a magnet attachment portion for attaching the slide-on portion to the frame attachment portion;
   wherein the magnet attachment portion is adapted to slide onto the magnet housing.

6. The system of claim 5, wherein the magnet applies a magnetic force to the magnet attachment portion to secure the slide-on portion onto the magnet housing.

7. The system of claim 5, wherein the device is a near-eye display system.

* * * * *